United States Patent
Ravindran et al.

(12) 
(10) Patent No.: US 10,540,203 B2
(45) Date of Patent: Jan. 21, 2020

(54) COMBINING PIPELINES FOR A STREAMING DATA SYSTEM

(71) Applicant: ENTIT SOFTWARE LLC, Sanford, NC (US)

(72) Inventors: Viji Kakkattu Ravindran, Bangalore (IN); Tamilarasi Kaliyamoorthy, Bangalore (IN); Vineetha Vasudevan, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/057,289

(22) Filed: Aug. 7, 2018

(65) Prior Publication Data

US 2019/0065248 A1    Feb. 28, 2019

(30) Foreign Application Priority Data

Aug. 29, 2017    (IN) .......................... IN201741030601

(51) Int. Cl.
*G06F 9/46* (2006.01)
*G06F 9/48* (2006.01)

(52) U.S. Cl.
CPC ............ *G06F 9/4881* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 6,694,310 | B1 | 2/2004 | Yu et al. |
| 7,568,189 | B2 | 7/2009 | Suba |
| 9,262,462 | B2 | 2/2016 | Merriman |
| 9,396,037 | B2 | 7/2016 | Morsi et al. |

OTHER PUBLICATIONS

Prihozhy, A. et al.; Synthesis and Optimization of Pipelines for HW Implementations of Dataflow Programs (Research Paper); Oct. 2015; pp. 1613-1626; available at http://ieeexplore.ieee.org.

*Primary Examiner* — Gregory A Kessler

(57) ABSTRACT

A technique includes comparing a first sequence of tasks of a first data processing pipeline of a plurality of data processing pipelines for a data streaming system to a second data processing pipeline of the plurality of data processing pipelines. The technique includes, based on the comparing, combining the first data processing pipeline and the second data processing pipeline into a single data processing pipeline.

20 Claims, 6 Drawing Sheets

COMBINING PIPELINES FOR A STREAMING DATA SYSTEM

CROSS-REFERENCE TO RELATED APPLICATION

This application is a Secondary U.S. application and claims priority to IN201741030601, filed on 29 Aug. 2018, and entitled "COMBINING PIPELINES FOR A STREAMING DATA SYSTEM".

BACKGROUND

A distributed stream data processing system may be used for purposes of processing "big data." In this context, "big data" refers to a relatively large volume of data. As examples, big data may be network data, which may be analyzed to identify failures and network intrusions; sensor data, which may be analyzed as part of quality control measures for a manufacturing process; and so forth. The distributed stream data processing system may gather its data from disparate data sources; and as such, the system may perform various extract, transform and load (ETL) operations for purposes of transforming the data from these disparate sources into a common format that may be stored and analyzed.

DETAILED DESCRIPTION

Figure 1:
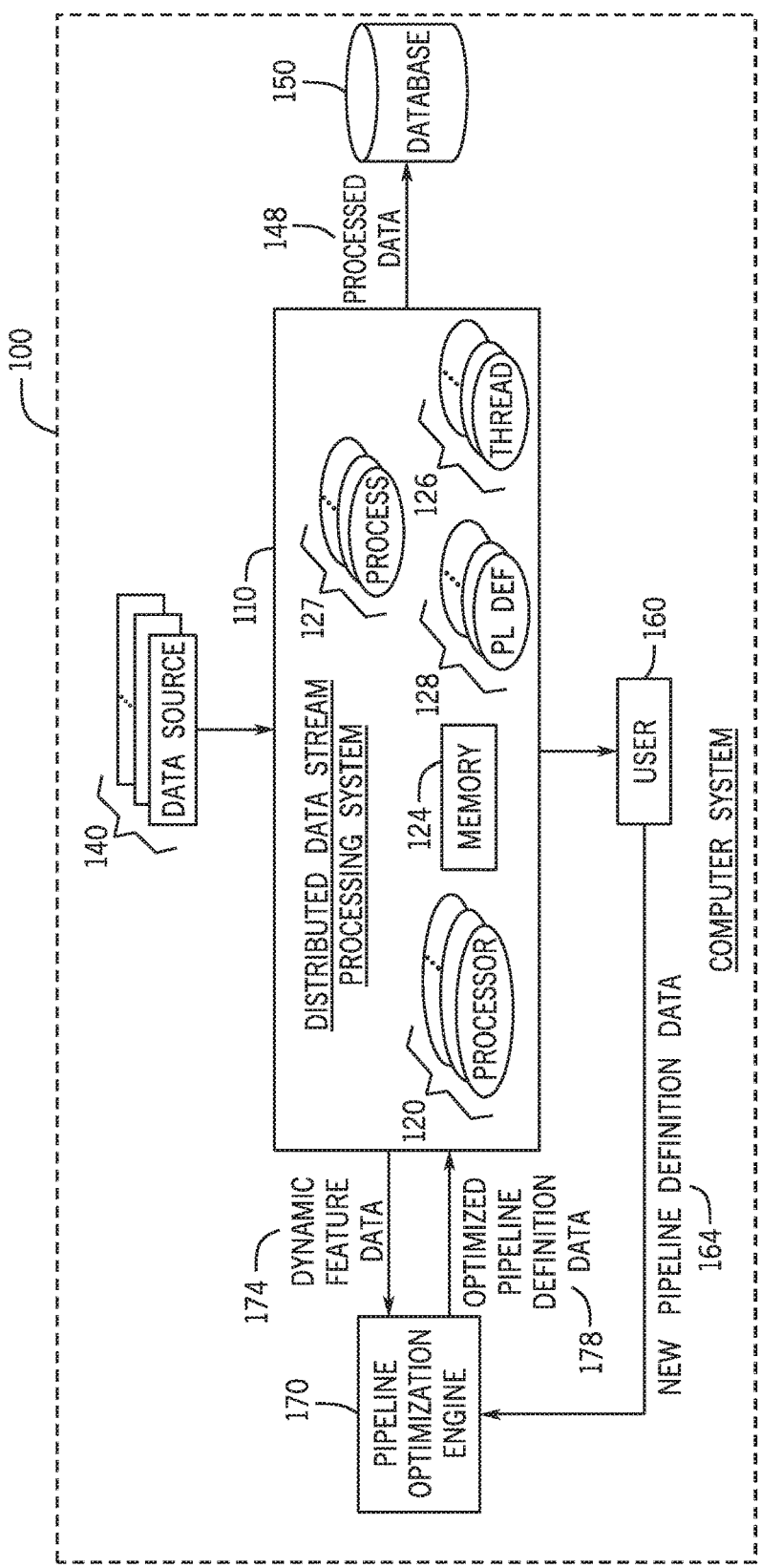
FIG. 1 is a schematic diagram of a computer system according to an example implementation.

In accordance with example implementations, a distributed data stream processing system (called a "streaming data system" herein) may perform various tasks pertaining to extract, transform and load (ETL) operations. In this manner, the streaming system may collect, or receive, data from various data sources, and this data is heterogeneous and thus, is processed differently.

A user of the streaming system may define different data processing pipelines for the streaming system, depending on the type of data flowing into the system. In general, new pipelines may be defined as data associated with new types of data flow into the streaming system.

In general, a "data processing pipeline" refers to a set of tasks, which are connected to form a data processing flow and, in general, the output of one task may be the input of the next task in the pipeline. A data processing pipeline may be modeled as a graph, where each node of the graph represents a task, and edges of the graph represent the flow from one task to another. In accordance with example implementations, a data processing pipeline may be modeled as a directed, or unidirectional, acyclic graph. In this manner, in accordance with example implementations, for a given node of the graph there is no path for starting at a given node (task) and follow a sequence of edges to loop back to the given node (task).

For a given data processing pipeline, the user defines tasks, which includes metadata that describes the tasks and the order in which the tasks are executed. The streaming system may implement the data processing pipeline that is defined by the user by launching one or multiple threads and/or one or multiple processes for each task. Moreover, the streaming system may, in accordance with example implementations, assign one or multiple central processing unit (CPU) processing cores to a given data processing pipeline task.

Table 1 below illustrates the processing of example tasks T1, T2, T3, T4 and T5 for a given data processing pipeline:

TABLE 1

| Time(t) | 1 | 2 | 3 | 4 | 5 | 6 | 7 | 8 |
|---|---|---|---|---|---|---|---|---|
| Row 1 | T1 | T2 | T3 | T4 | T5 | | | |
| Row 2 | | T1 | T2 | T3 | T4 | T5 | | |
| Row 3 | | | T1 | T2 | T3 | T4 | T5 | |
| Row 4 | | | | T1 | T2 | T3 | T4 | T5 |

As illustrated in Table 1, at time t=1, task T1 processes Row 1; at time t=2, task T1 processes Row 2 and in parallel, task T2 processes Row 1 (i.e., the tasks T1 and T2 execute in parallel) at time t=3, tasks T3, T2 and T1 process Rows 1, 2 and 3, respectively in parallel; and so forth.

In general, the amount of resources that are consumed by the streaming system executing data processing pipelines, increases with the number of the pipelines. In this manner, the number of processes and threads that are launched in a streaming system increases with the number of pipeline tasks that are being executed in the streaming system. Processes and threads are relatively expensive from the standpoint of resources, as they consume memory to maintain the corresponding stacks. Some operating systems may impose an upper limit on the number of processes/threads that may exist at a given time.

In accordance with example implementations that are described herein, a pipeline optimization engine regulates the number of data processing pipelines that are being executed by a streaming system based on static and dynamic characteristics of the pipelines. More specifically, in accordance with example implementations, the pipeline optimization engine may construct graphs that represent data processing pipelines from static information, such as metadata that describes user-defined data processing pipelines for the streaming system; and based on a graph analysis of these constructed graphs, the pipeline consolidation engine may consolidate the pipelines.

Moreover, as described herein, in accordance with example implementations, the pipeline optimization engine may consider non-functional criteria associated with the data processing pipelines when determining whether to consolidate pipelines. In this manner, a given data processing pipeline may be associated with non-functional criteria, which pertains to a characteristic of the pipeline, other than a parameter describing how the pipeline functions. As examples, non-functional criteria may include an overall latency or throughput for the data processing pipeline, as opposed to, for example, a parameter describing the functioning of a task or a data flow through the pipeline. In this manner, in accordance with some implementations, the pipeline optimization engine may combine data processing pipelines based on respective latencies, respective throughputs, and so forth, so that the non-functional criteria are satisfied (the consolidated pipeline has a latency that satisfies the latency criteria of the data processing pipelines that are combined, for example).

In accordance with example implementations, the pipeline optimization engine may consider dynamic characteristics of the pipelines, such as data representing observed metrics of data processing pipelines that are currently being executed by the streaming system. In this manner, in accordance with example implementations, the pipeline optimization engine may, for example, observe, or monitor, historic data, such as observed latencies and throughputs of currently executing pipelines (as well as possibly previously executed and retired pipelines). Based on these observed metrics, the pipeline optimization engine may predict future corresponding metrics for the pipelines, such as metrics that represent predicted latencies and throughputs. From this information, the pipeline optimization engine may, in accordance with example implementations, take appropriate actions, such as, for example, splitting, or dividing, a previously consolidated pipeline into two or more pipelines.

As a more specific example, FIG. 1 depicts a computer system 100 that includes a distributed data stream data processing system, or "streaming system 110." In general, the streaming system 110 processes "big data" derived from one or multiple data sources 140. As examples, the streaming system 110 may process financial data, social network data, network data, manufacturing data, data pertaining to newsworthy events, and so forth. In general, the data processing system 110 may perform various processing operations on the data received from the data sources 140 for purposes of transforming the data from one or multiple data formats into one or multiple consolidated data formats that may be stored by the system 110 (in one or multiple databases or in a consumer database, as examples) and/or analyzed in consuming applications. In this manner, for this purpose, the streaming system 110 may perform ETL operations via data processing pipelines.

For purposes of executing the data processing pipelines and managing the creation and retirement of pipelines, the streaming system 110 may include one or multiple processors 120 (one or multiple CPUs, one or multiple CPU processing cores, and so forth). Moreover, the streaming system 110 may include various other hardware and software resources, such as a memory 124; one or multiple threads 126; processes 127, and so forth. In general, a given data processing pipeline that is being executed by the streaming system 110 may be defined by a corresponding set of data (metadata, for example) that describes a corresponding pipeline definition 128. For a given data processing pipeline that is described by a corresponding pipeline definition 128, the streaming system 110 may allocate corresponding resources of the system 110, such as launching one or multiple threads 126, launching one or multiple processes 127, allocating memory for the corresponding stack, assigning one or multiple CPU cores to tasks for the pipeline, and so forth.

In accordance with example implementations, a user 160 may create new pipeline definition data 164 (XML metadata, for example), which describes the definition for a new pipeline. In this manner, the new pipeline definition data 164 may define various aspects of a data processing pipeline, such as, for example, the defined tasks and the order in which the tasks are executed. Moreover, the new pipeline definition data 164 may characterize performance criteria for the pipeline, such as a latency for the pipeline, a throughput for the pipeline, and so forth. A pipeline optimization engine 170 of the computer system 100 receives and analyzes the new pipeline definition data 164 for purposes of determining whether the newly-defined data processing pipeline may be consolidated with another pipeline currently being executed by the streaming system 110.

In general, the pipeline optimization engine 170 considers the existing pipelines being executed by the streaming system 110, along with system and pipeline metric data 174 (i.e., observed, historic metric data) for purposes of determining whether the new data processing pipeline may be combined with another data processing pipeline being executed by the streaming system 110. Based on such factors, in accordance with example implementations, the pipeline optimization engine 170 provides optimized pipeline definition data 178 that combines data processing pipelines to describe an optimized set of data processing pipelines for the streaming system 110. Accordingly, the streaming system 110, in accordance with example implementations, updates the pipeline definitions 128 (describing the pipelines 128 being executed by the system 110) based on the optimized pipeline definition data 178 and launches and/or retrieves resources accordingly.

Figure 2A:
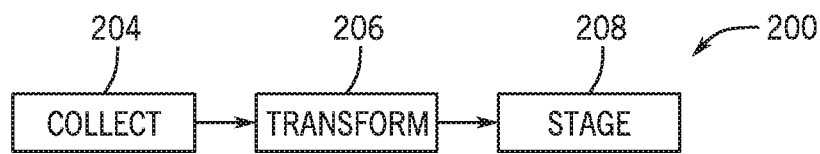
FIGS. 2A, 2B and 2C are illustrations of data processing pipelines executed by a distributed stream data processing system of FIG. 1 according to an example implementation.
Figure 2B:
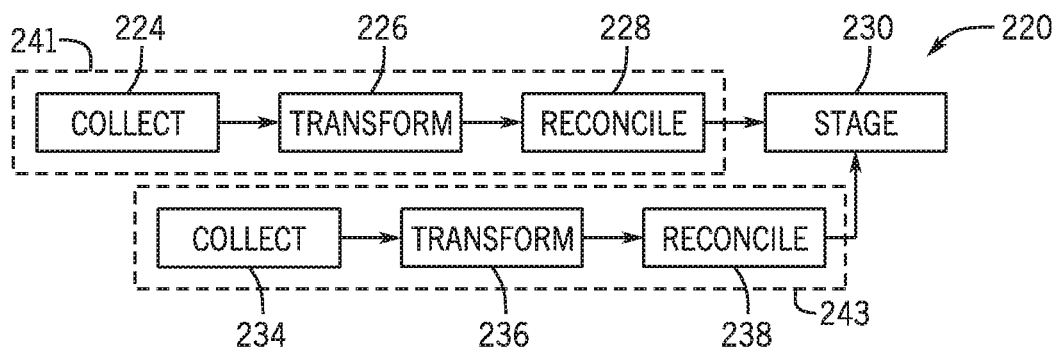
Figure 2C:
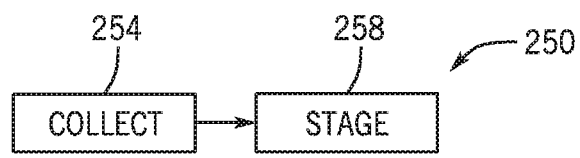

A data processing pipeline may take on various forms. Regardless of the particular form, in accordance with example implementations, the data processing pipeline involves a sequence of tasks, i.e., different data processing steps, and defines the sequence of the flow, the latency, and throughput criteria of the pipeline. FIGS. 2A, 2B and 2C depict example data processing pipelines in accordance with some implementations. For example, FIG. 2A depicts a data processing pipeline 200 that is associated with a first ETL proceeding pattern and includes a first task 204, which represents operations to collect data, belonging to a certain source data. The output from the collect task 204 is provided to a transform task 206, which represents operations to convert the data values from the data source from a source data format into a target format. This transformation may involve a mapping, such as one-to-many or a many-to-one mapping. As depicted in FIG. 2A, the data processing pipeline 200 further involves the output from the transform task 206 being provided to a stage task 208, which represents operations to load the transformed data into the database 150.

FIG. 2B depicts another data processing pipeline 220 associated with another ETL processing pattern. For the data processing pipeline 220, there are two parallel processing paths 241 and 243 that end at a stage task 230. In this manner, for the first processing path 241, a collect task 224 provides an output to a transform task 226, and the transform task 226 provides an output to a reconcile task 228. In general, the reconcile task 228 associates additional information to the transformed data, and the output of the reconcile task 228 is provided to the stage task 230. For the other parallel processing paths 243, this path 243 involves a collect task 234 that provides an output to a transform task, which provides an output to a reconcile task 238, which, in turn, provides an output to the stage task 230.

FIG. 2C depicts a data processing pipeline 250 associated with another ETL processing pattern. For this processing pattern, the data processing pipeline 250 does not include a transform or reconcile task. Instead, the data processing pipeline 250 includes a collect task 254 that provides an output to a stage task 258.

In accordance with example implementations, the streaming system 110 identifies new data types and informs the user 160 to allow the user to specify the particular data processing pipeline for this data type (via the new pipeline definition data 164).

Figure 3:
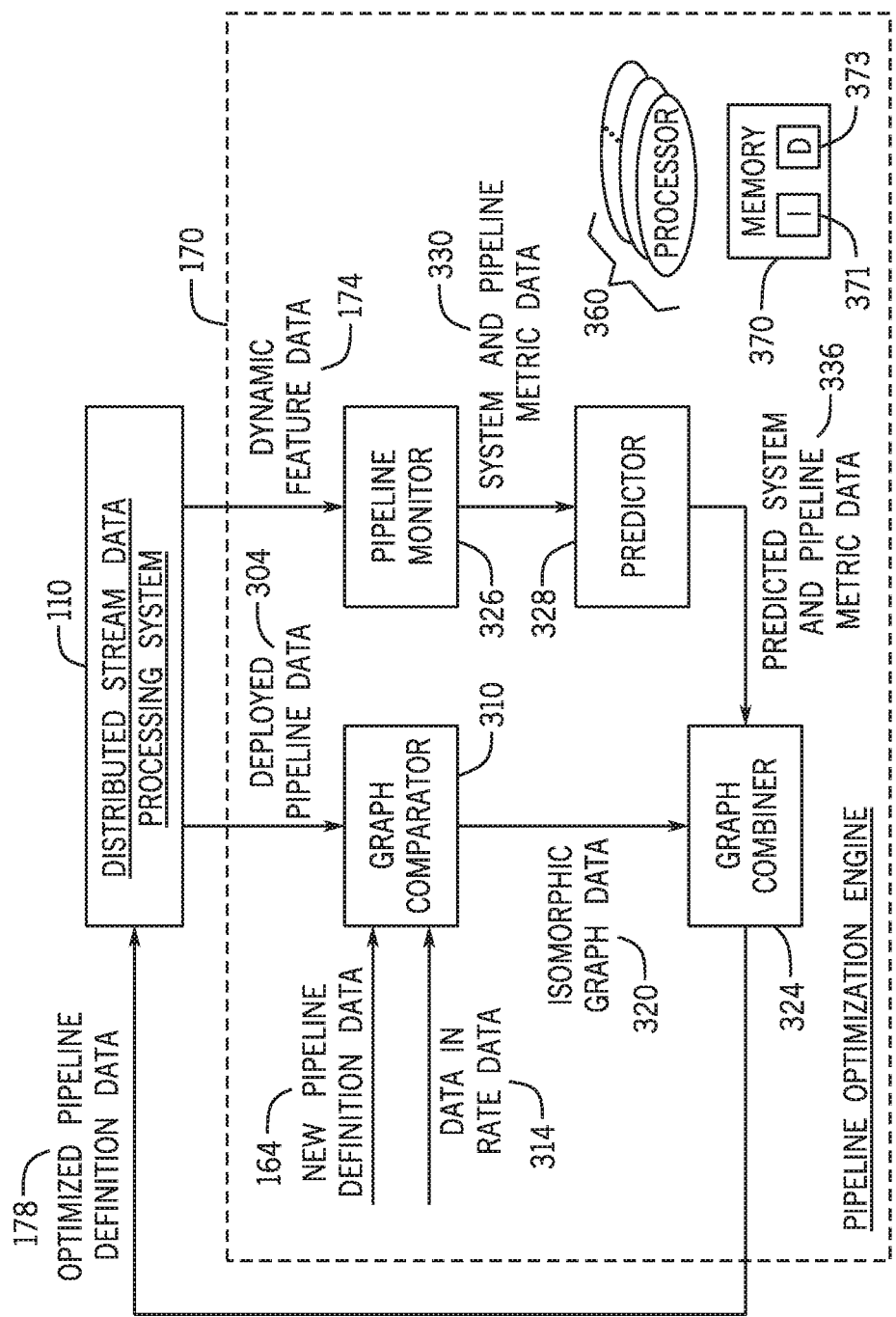
FIG. 3 is a schematic diagram of a pipeline optimization engine of the computer system of FIG. 1 according to an example implementation.

Referring to FIG. 3, in accordance with example implementations, the pipeline optimization engine 170 performs a graph analysis for purposes of determining whether to consolidate a new data processing pipeline with an existing data processing pipeline that is currently being executed by the streaming system 110. For this purpose, in accordance with example implementations, the pipeline optimization engine 170 includes a graph comparator 310. In general, the graph comparator 310 constructs a representation of existing data processing pipelines (i.e., the data processing pipelines currently being executed by the streaming system 110) from deployed pipeline data 304 that is provided by the streaming system 110. The graph comparator 310 further compares the new pipeline definition data 164 provided by the user along with data 314 describing additional metadata, such as the expected data in rate for purposes of providing data 320, which identifies isomorphic graphs.

In general, "isomorphic graphs" refer to graphs that have the same number of vertices, and the vertices are connected in the same manner. In terms of a data processing pipeline, each task of the pipeline corresponds to a graph vertex, and edges of the graph correspond to the connections between the tasks. The graph comparator 310 compares the corresponding unidirectional acyclic graph corresponding to the new data processing pipeline to unidirectional acyclic graphs representing the deployed data processing pipelines in the streaming system 110; and based on a comparison of these graphs, the graph comparator 310 generates the isomorphic graph data 320. In response to isomorphic graphs being identified by the graph comparator 310, a graph combiner 324 of the pipeline optimization engine 170 combines the corresponding data processing pipelines and communicates corresponding optimized pipeline definition data 178 (which represents a pipeline as a result of the consolidation of the pair of pipelines into a single pipeline) to the streaming system 100.

In accordance with example implementations, the graph combiner 324 combines a pair of pipelines by creating a pipeline that has the same associated vertices and edge connections. For example, the graph combiner 324 may combine Pipeline 1 and Pipeline 2 (which are isomorphic graphs) to create Pipeline 3. Pipeline 1 has three tasks: Task A is performed on an input; Task B processes the output of Task A; and Task C processes the output of Task B to provide an output for Pipeline 1. Pipeline 2 has three tasks: Task D is performed on an input; Task E processes the output of Task D; and Task F processes the output of Task E to provide an output for Pipeline 2. Pipeline 3, the consolidated pipeline for this example, has three tasks: Task G, which is a combination of Tasks A and D and may be assigned to a corresponding thread; Task H, which is a combination of Tasks B and E and may be assigned to a corresponding thread; and Task I, which is a combination of Tasks C and F and may be assigned to a corresponding thread.

In accordance with some implementations, the graph combiner 324 may determine that previously-combined data processing pipelines should be separated back into two or more data processing pipelines. In this manner, the graph combiner 324 may receive data 336 that represents predicted performance metrics associated with the pipelines being executed by the streaming system 110. In this manner, in accordance with example implementations, a pipeline monitor 326 of the pipeline optimization engine may receive the dynamic feature data 174 from the streaming system 110. The dynamic feature data 174 allows the pipeline monitor 330 to provide system and pipeline metric data 332, which may, for example, identify processing capacity of the streaming system 110, latencies of the data processing pipelines being executed by the streaming system 110, throughputs of these pipelines, and so forth. Based on the data 332, a predictor 328 of the pipeline optimization engine 170 provides predicted system and pipeline metric data 336, which predicts a future performance for the streaming system 110. In this manner, the data 336 may predict future latencies and throughputs for existing data processing pipelines being processed by the streaming system 110, future capacity for the streaming system 110, and so forth. Based on this information, the graph combiner 324 may accordingly decide to separate, or split, an existing data processing pipeline into multiple pipelines.

In accordance with example implementations, one or multiple components of the pipeline optimization engine 170 may be formed from one or multiple processors 360 (CPUs, CPU processing cores, and so forth) executing machine executable instructions (i.e., "software"), which are stored in a memory 370 of the pipeline optimization engine 170. In this manner, in accordance with some implementations, the graph comparator 310, the graph combiner 324, the pipeline monitor and the predictor may be formed by one or multiple processors 360 executing machine executable instructions 371 that are stored in the memory 370. The memory 370 may further store data 373, which represents preliminary, intermediate and final results associated with the processing by the pipeline operation engine 170. In accordance with the example implementations, the memory 370 is a non-transitory storage medium which may be formed from volatile memory devices, non-volatile memory devices, phase change memory devices, semiconductor storage devices, magnetic storage devices, optical storage devices, memristors, a combination of one or more of the foregoing storage technologies, and so forth.

In accordance with further example implementations, one or multiple components of the pipeline optimization engine 170 may be formed from hardwired circuits. As examples, in accordance with some implementations, one or more components of the pipeline optimization engine 170 may be formed from one or multiple field programmable gate arrays (FPGAs), and/or one or multiple application specific integrated circuits (ASICs).

The following is an example of user-defined XML metadata, which may be used to define a new data processing pipeline in accordance with example implementations:

```
<?xml version="1.0" encoding="UTF-8" standalone="yes"?>
<ns1:JobStream xmlns:ns1="http://schemas.hp.com/bto/dwh/v1/dw_etl_stream"
dwid="ETL_SystemManagement_PA@Fact_CPU" businessname="ETL Stream for
System Management PA Facts_CPU" latency="55" throughput="480000">
<ns1:JobStreamSteps>
<ns1:JobStreamStep dwid="Collect_CPU" businessname="Collect CPU data in .csv
file"
```

-continued

```
catalog="Platform" executableidentifier="COLLECT" arguments="CPU:SCOPE />
<ns1:JobStreamStep dwid="Mapper_CPU" businessname="Transform CPU data by
filtering out spurious records and aligning date format" catalog="Platform"
executableidentifier="TRANSFORM" arguments="CPU:SCOPE/>
<ns1:JobStreamStep dwid="Reconcile_CPU" businessname="Reconcile CPU
metrics with Node Cl dimension" catalog="Platform"
executableidentifier="RECONCILE" arguments="CPU:SCOPE"/>
<ns1:JobStreamStep dwid="Stage_CPU" businessname="Stage CPU data"
catalog="Platform" executableidentifier="STAGE"
arguments="Stage_SM_CPU_SCOPE_SR_SM_CPU"/>
<ns1:JobStreamSteps>
<ns1:JobStreamLinks>
<ns1:JobStreamLink stepidentifier="Collect_CPU"/>
<ns1:JobStreamLink stepidentifier="Mapper_CPU"
parentstepidentifier="Collect_CPU"/>
<ns1:JobStreamLink stepidentifier="Reconcile_CPU"
parentstepidentifier="Mapper_CPU"/>
<ns1:JobStreamLink stepidentifier="Stage_CPU"
parentstepidentifier="Reconcile_CPU"/>
</ns1:JobStreamLinks>
```

Example 1 Pipeline Metadata

For this example, specific tasks are defined by the delimiter "JobStreamStep," and the delimiter "JobStreamLink" defines the edges between the tasks, i.e., the connections between the tasks and the processing order. Moreover, line 4 of Example 1 defines a throughput and a latency for the pipeline.

Figure 4:
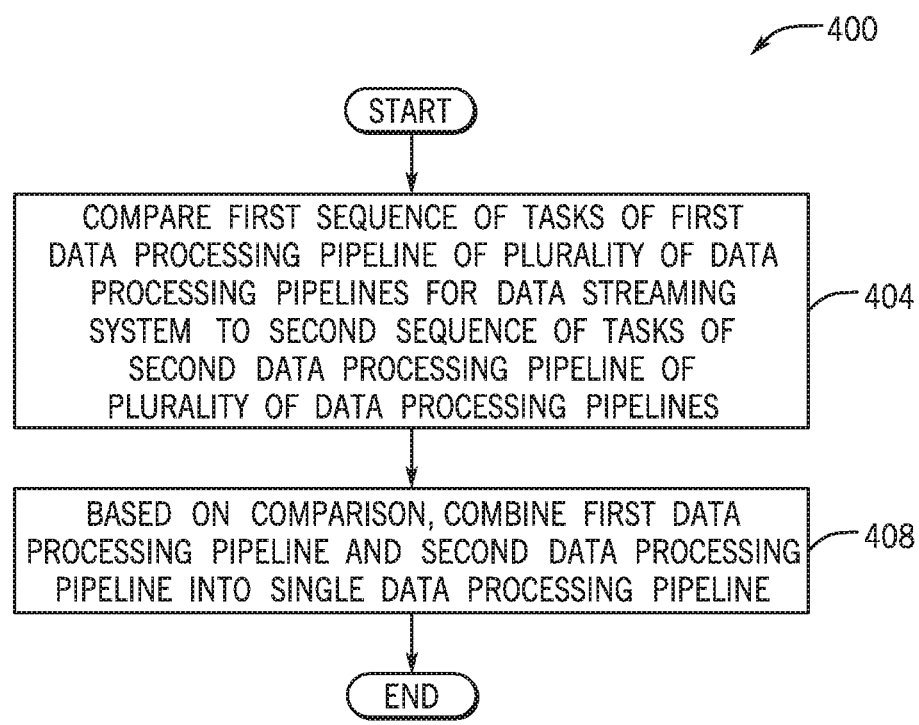
FIGS. 4 and 5 are flow diagrams depicting techniques to manage data processing pipelines according to example implementations.

Thus, referring to FIG. 4, in accordance with example implementations, a technique 400 includes comparing (block 408) a first sequence of tasks of a first data processing pipeline of a plurality of data processing pipelines for a data streaming system to a second sequence of tasks of a second data processing pipeline of the plurality of data processing pipelines. The technique 400 includes, based on the comparison, combining the first data processing pipeline and the second data processing pipeline into a single data processing pipeline.

Figure 5:
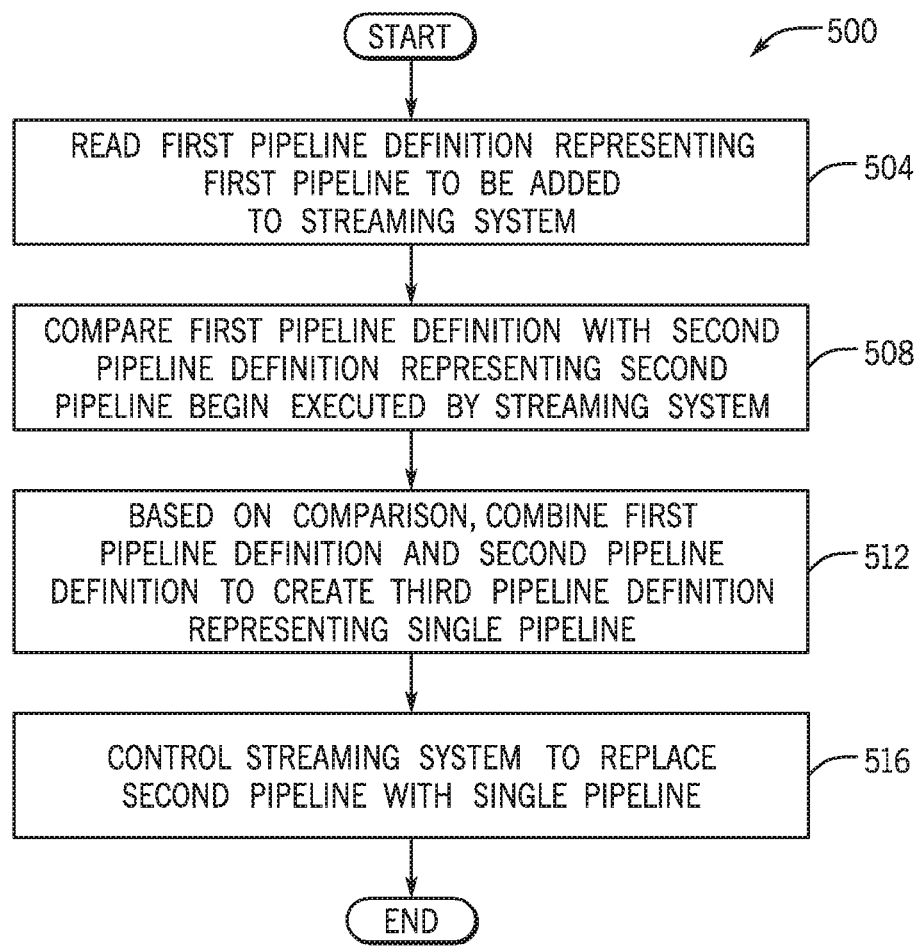
Figure 6:
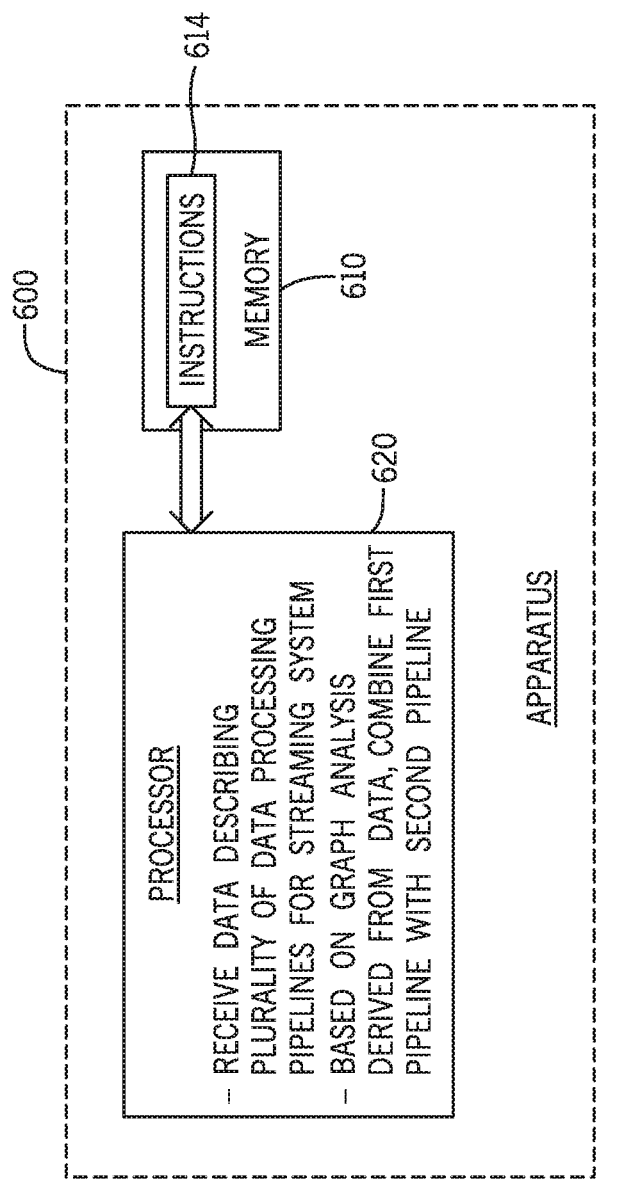
FIG. 6 is a schematic diagram of an apparatus to manage data processing pipelines according to an example implementation.

More specifically, referring to FIG. 5, in accordance with example implementations, a technique 500 includes reading (block 504) a first pipeline definition representing a first pipeline to be added to a streaming system and comparing (block 508) the first pipeline definition with a second pipeline definition representing a second pipeline being executed by the streaming system. Pursuant to the technique 500, based on the comparison, the first pipeline definition is combined with the second pipeline definition to create a third pipeline definition representing a single pipeline, pursuant to block 512. The streaming system may then be controlled, pursuant to block 516, to replace the second pipeline with the single pipeline.

In accordance with example implementations, an apparatus 600 includes a processor 620 and a memory 610, which stores instructions 614. The instructions 614, when executed by the processor 620, cause the processor to receive data describing a plurality of data processing pipelines for a streaming system and based on a graph analysis derived from the data, combine the first pipeline with the second pipeline.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
comparing a first sequence of tasks of a first data processing pipeline of a plurality of data processing pipelines for a data streaming system to a second sequence of tasks of a second data processing pipeline of the plurality of data processing pipelines; and
based on the comparing, combining the first data processing pipeline and the second data processing pipeline into a single data processing pipeline.

2. The method of claim 1, wherein comparing the first sequence of tasks to the second sequence of tasks comprises:
determining a first graph representation for the first data processing pipeline based on metadata describing the first data processing pipeline;
determining a second graph representation for the second data processing pipeline based on metadata describing the second data processing pipeline; and
comparing the first graph to the second graph.

3. The method of claim 2, wherein comparing the first graph to the second graph comprises determining whether the first and second graphs are isomorphic graphs, and combining the first data processing pipeline and the second data processing pipeline comprises combining the first data processing pipeline and the second data processing pipeline in response to determining that the first and second graphs are isomorphic graphs.

4. The method of claim 1, further assigning a processing thread to a sequence of tasks representing the single data processing pipeline.

5. The method of claim 1, further comprising receiving metadata describing the plurality of data processing pipelines, and comparing the data processing pipelines based on the metadata.

6. The method of claim 5, wherein the metadata describes the first sequence of tasks of the first data processing pipeline and the second sequence of tasks of the second data processing pipeline.

7. The method of claim 6, wherein:
the metadata describing the first data processing pipeline describes a first non-functional criterion associated with the first data processing pipeline;
the metadata describing the second data processing pipeline describes a second non-functional criterion associated with the second data processing pipeline; and combining the first data processing pipeline and the second data processing pipeline comprises combining the first data processing pipeline and the second data processing pipeline based on the first non-functional criterion and the second non-functional criterion.

8. The method of claim 7, wherein:
the first non-functional criterion comprises a first latency;
the second non-functional criterion comprises a second latency; and
combining the first data processing pipeline and the second data processing pipeline comprises combining the first data processing pipeline and the second data processing pipeline based on the first latency and the second latency.

9. An apparatus comprising:
a processor; and
a memory to store instructions that, when executed by the processor, cause the processor to:
receive data describing a plurality of data processing pipelines for a streaming system;
based on a graph analysis of the plurality of data processing pipelines derived from the data, combine a first data processing pipeline of the plurality of data processing pipelines with a second data processing pipeline of the plurality of data processing pipelines.

10. The apparatus of claim 9, wherein the data describes tasks of the first data processing pipeline and a processing order of the tasks.

11. The apparatus of claim 9, wherein the instructions when executed by the processor causes the processor to:
combine the first data processing pipeline with the second data processing pipeline to create a third data processing pipeline;
submit the third data processing pipeline to the streaming system;
remove the second data processing pipeline from the streaming system;
monitor a metric associated with third data processing pipeline; and
based on the metric:
submit the first data processing pipeline and the second data processing pipeline to the streaming system; and
remove the third data processing pipeline from the streaming system.

12. The apparatus of claim 11, wherein the metric comprises a latency of the third data processing pipeline or a data input rate to the third data processing pipeline.

13. The apparatus of claim 11, wherein the metric comprises a resource usage associated with the third data processing pipeline.

14. A non-transitory machine readable storage medium storing instructions that, when executed by a machine, cause the machine to:
read a first pipeline definition representing a first pipeline to be added to a streaming system;
compare the first pipeline definition with a second pipeline definition representing a second pipeline being executed by the streaming system;
based on the comparison, combine the first pipeline definition and the second pipeline definition to create a third pipeline definition representing a single pipeline; and
controlling the streaming system to replace the second pipeline with the single pipeline.

15. The non-transitory machine readable storage medium of claim 14, wherein the instructions, when executed by the machine, cause the machine to combine the first pipeline definition with the second pipeline definition to create the single pipeline based on a first latency represented by the first pipeline definition and a second latency represented by the second pipeline definition.

16. The non-transitory machine readable storage medium of claim 14, wherein the instructions, when executed by the machine, cause the machine to combine the first pipeline definition with the second pipeline definition to create the single pipeline based on a first criterion represented by the first pipeline definition and a second criterion represented by the second pipeline definition.

17. The non-transitory machine readable storage medium of claim 16, wherein the first criterion comprises a latency and the second criterion comprises a latency.

18. The non-transitory machine readable storage medium of claim 16, wherein the first criterion comprises a throughput and the second criterion comprises a throughput.

19. The non-transitory machine readable storage medium of claim 14, wherein the instructions, when executed by the machine, cause the machine to combine the first pipeline definition with the second pipeline definition to create the single pipeline based on an available capacity of the streaming system.

20. The non-transitory machine readable storage medium of claim 14, wherein the instructions, when executed by the machine, cause the machine to determine whether the first pipeline and the second pipeline are isomorphic graphs and combine the first pipeline and the second pipeline based on the determination.

* * * * *